A. H. NEULAND.
DYNAMO ELECTRIC MACHINE.
APPLICATION FILED JULY 29, 1915.
1,233,899.
Patented July 17, 1917.
2 SHEETS—SHEET 2.
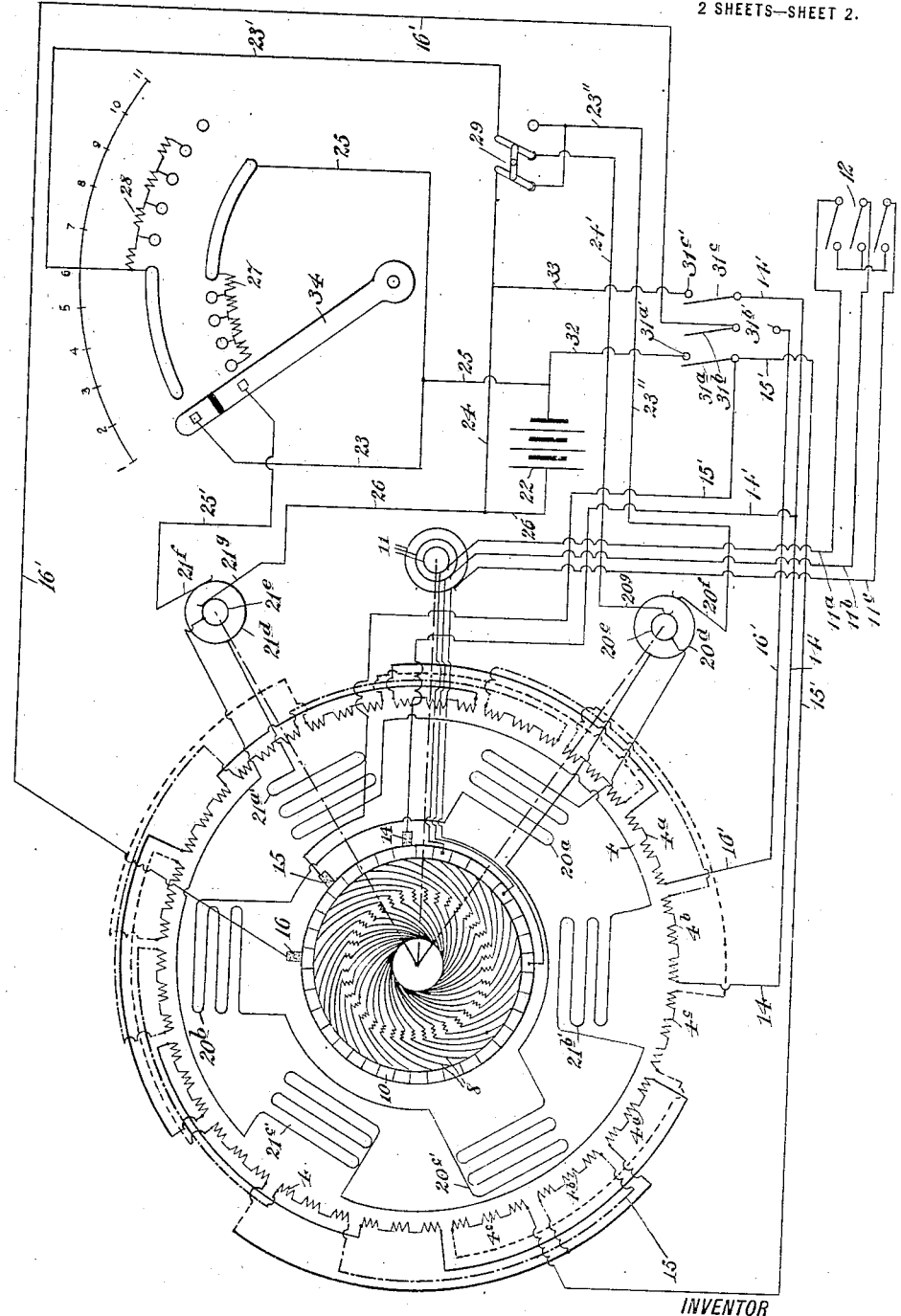
INVENTOR
Alfons H. Neuland
BY
Rosenbaum, Stockbridge &
ATTORNEY

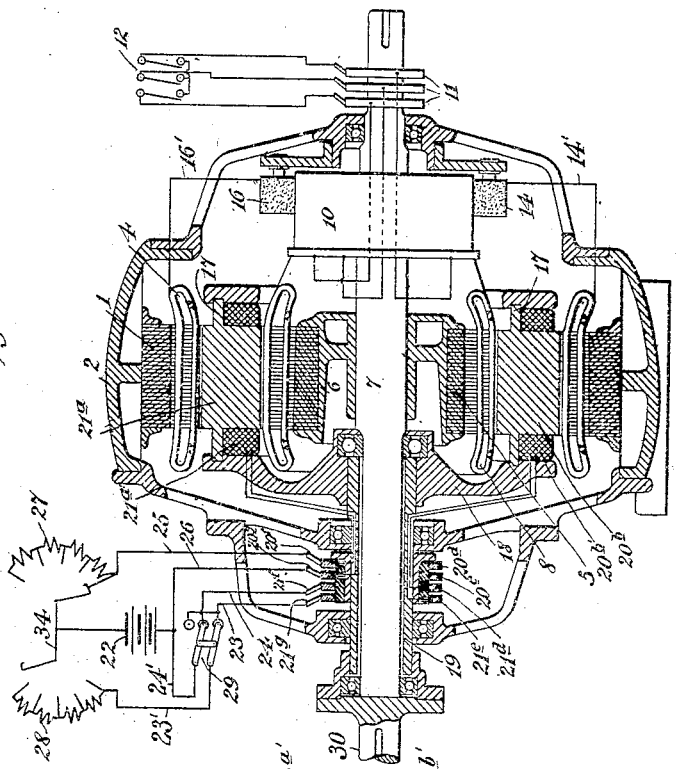

UNITED STATES PATENT OFFICE.

ALFONS H. NEULAND, OF NEW YORK, N. Y.

DYNAMO-ELECTRIC MACHINE.

1,233,899.

Specification of Letters Patent.

Patented July 17, 1917.

Application filed July 29, 1915. Serial No. 42,584.

*To all whom it may concern:*

Be it known that I, ALFONS H. NEULAND, a subject of the Czar of Russia, residing at the city of New York, in the borough of Manhattan and State of New York, have invented certain new and useful Improvements in Dynamo-Electric Machines, of which the following is a full, clear, and exact description.

My invention relates to dynamo-electric machines, and embodiments of my invention are adaptable for use as a power transmission device for transmitting power from one rotating element, such as a shaft, to another rotatable element.

One object of my invention is to provide simple, reliable and efficient means for adjusting and regulating the speed and torque of the machine. Another object is to minimize the iron losses in the machine and obtain a maximum of efficiency when operating at normal speed. Another object is to provide simple and efficient means for reversing the machine. Other objects are simplicity, strength and durability of construction. Still other objects and advantages of my invention will appear from the following description.

Embodiments of my invention are well adaptable for use both as a starter and as an adjustable speed transmission for automobiles, although it will be readily understood that embodiments of my invention may be applied to many other uses as power transmission devices, to transmit power from one rotating element to another.

In my former application, Serial No. 855,873, filed August 8, 1914, I have disclosed and claimed a dynamo-electric machine capable of use either as a power transmitting device or an adjustable speed alternating current motor, comprising a rotatable armature provided with a direct current winding and a commutator; a stationary element concentric with and surrounding the armature and provided with a polyphase winding connected with stationary polyphase brushes on the commutator; and a rotatable field element comprising a plurality of field poles disposed between the stationary element and the armature, together with a source of energizing current for the field poles. In that device, the armature, which is the driver when the device is used for power transmission, has, by reason of its rotation against the field, a current generated in it, which is continuous and direct so long as the field element, which is the driven element, is stationary. When the field element begins to rotate, the current at the stationary polyphase brushes becomes alternating, producing in the windings of the stationary element a revolving field of a velocity equal to that of a rotating field element. The torque of the driven field at standstill and low speeds is therefore very great, being equal to the sum of the torques exerted by the armature and the stationary element. The direction of rotation of the driven field element is reversed relative to that of the driving armature by reversing the leads connecting the stationary brushes with the stator winding. Since the stator torque upon the field element at standstill and low speeds exceeds the armature torque many times by reason of the excess of ampere turns of the stator over that of the armature, a reversal of the connection between the stationary brushes and the stator winding, so as to produce a torque in the stator upon the field element in opposition to that of the armature, causes the field to rotate in opposition to the armature.

As pointed out in my said former application, the potential of the uniformly driven armature, which, when used for automobile transmission, is connected to the unidirectionally rotating engine, is highest when the field element is at rest and decreases when the field follows the armature. Furthermore, a counter-potential is generated in the windings of the stator which is zero when the field element is at rest. Therefore, an increase in the speed of the field element is accompanied by a decreased armature potential and an increased stator counter-potential, and the two become equal and the current becomes zero when the field element reaches a certain speed, thus limiting the speed irrespective of the load.

There must be a slip from this critical speed, however, in order that the armature potential may sufficiently predominate and force the requisite current through the windings to furnish the field element with the necessary torque.

In my said former device, a plurality of steps in the speed of the field or driven element is obtained by changing the voltage relation between the armature and stator. This is done by changing the turns in series of the stator winding or by inserting an adjustable auto-transformer between the stationary brushes and the stator winding. This regulation of the speed requires a polyphase controlling switch of sufficient capacity to carry the power current, or, in some cases, a polyphase auto-transformer, while a switch for reversing the power leads is required to reverse the direction of rotation.

In accordance with my present invention, I dispense with the necessity of switching the power leads, and of using an auto-transformer in reversing or adjusting the speed of the driven field. This invention is characterized by the employment of two fields, one acting on the armature and the other acting on the stator, and, for the purpose of regulating the speed of the machine, my invention comprehends means for varying the strength of one field relative to that of the other. My invention also includes means for reversing the magnetizing current of one field relative to that of the other in order to reverse the machine.

More specifically, the field member comprises two sets of independently energized field magnets, one set being in inductive relation to the armature and the other being in inductive relation to the stator. Preferably, these sets of field magnets are carried upon opposite sides of a rotatable magnetic ring, the ring having external and internal polar projections arranged in alternate relation to each other and forming the cores of the field magnets. The means for varying the relative field strengths preferably consists of two rheostats disposed in the respective magnetizing circuits, and to reverse the relative direction of the magnetizing currents, a pole changer is preferably provided in one of the circuits.

My invention also includes various other features of construction and arrangements and combinations of parts, as will hereinafter more fully appear.

I shall now describe the illustrated embodiment of my invention, and shall thereafter point out my invention in claims.

Figure 1 is a longitudinal central section of a dynamo-electric machine embodying my invention, showing in diagram the magnetizing circuits for the fields;

Fig. 2 is a transverse central section of the same; and

Fig. 3 is a diagram of the electric circuits of the illustrated machine.

The illustrated machine comprises a rotative armature member which is the driver and includes a commutator, and an external annular stator and polyphase winding therefor surrounding the armature and including stationary polyphase brushes connected to the winding and engaging the commutator, and a driven rotatable field member between the stator and armature having two sets of field coils arranged in inductive relation to the stator and armature, respectively.

The stator 1 is laminated and annular in shape and is carried on the inside of the cylindrical portion 2 of the frame or casing. Suitable longitudinal slots 3 are provided at the inner periphery of the stator for the reception of the polyphase stator winding 4. The armature core 5 is laminated and mounted upon a hub 6 secured to the shaft 7. The armature winding 8 is embedded in suitable longitudinal slots 9 in the face of the armature core. The commutator 10 is also carried by the shaft 7 and rotates with the armature with which it is electrically connected, as shown. Three slip rings 11 on the shaft 7 are connected to the commutator, as shown in Figs. 2 and 3, and are arranged to be short-circuited through a switch 12. At full speed of the field element the switch 12 is thrown so as to short circuit the leads to the slip rings, which is the position shown.

Polyphase brushes 14, 15 and 16 are carried by the frame of the machine and engage the commutator 10, as shown particularly in Fig. 3, and these brushes are connected through the leads 14', 15' and 16' to the respective phases of the stator winding 4.

The field member comprises two sets of field magnets carried by the magnetic ring 17, which is disposed in the annular space between the stator and armature and is carried by a steel spider or bracket 18, which is fixed to a sleeve 19 rotatably surrounding one end of the shaft 7 and coupled to the driven shaft. The ring 17 has six integral radially extending steel poles arranged alternately internally and externally thereof, the intermediate portions of the ring forming magnetic yokes connecting the pole faces on one side with the adjacent pole faces on the other side. The poles extend substantially across the annular space between the armature and stator and the yoke portions of the ring 17 connect the inner ends of the three external poles, numbered $20^a$, $20^b$, and $20^c$, with the outer ends of the three internal poles numbered $21^a$, $21^b$ and $21^c$. These two sets of poles form the cores of two sets of field magnets arranged in inductive relation to the stator and armature, respectively. The field coils $20^{a'}$, $20^{b'}$ and $20^{c'}$ of the stator or external magnets are wound in a like direction and connected in series, and similarly the field coils $20^{a'}$, $21^{b'}$ and $21^{c'}$ of the armature or internal coils are wound in the same direction and opposite to that of the stator field coils and are connected in series. Two pairs of slip rings $20^d$, $20^e$, and $21^d$, $21^e$, on the sleeve 19 are connected to the respective sets of field magnets. The source of magnetizing current is shown as a battery 22, the slip rings being connected therewith by brushes $20^f$, $20^g$ and $21^f$, $21^g$, respectively, and leads 23, 24, 25 and 26, respectively. (See Fig. 1). The two fields are thus independently energized, and to vary the relative field strengths rheostats 27 and 28 are provided in the respective field circuits, while to reverse the relative direction of the two magnetizing currents, a pole changer 29 is provided in one of the circuits, shown as the stator field circuit.

When the stator and armature fields are equally and oppositely excited, the flux of each adjacent pair of field poles traverses both pole pieces and the connecting portions of the armature and stator, without traversing any of the yoke portions of the ring forming adjacent poles. Upon weakening the current in the internal or armature field coils, the flux through the armature is decreased while that through the stator is not changed, the difference between the stator and armature fluxes traversing the ring. The stator flux is substantially unaffected even when the armature field is entirely cut off, all of the stator flux in that event passing through the yoke portions of the ring; and when the current in the armature field coils is reversed, the stator field still remains the same, but the yoke portions of the ring then carry both the stator and the armature field fluxes. Therefore, either the armature or the stator field may be varied or reversed without materially affecting the other.

The armature winding 8 is a series winding and is wound for six poles. The current generated in the armature is commutated by the commutator 10 and conducted to the stator windings 4 through the stationary polyphase brushes 14, 15 and 16 and their respective leads as above described. These brushes are so arranged that polyphase currents can be collected from the commutator by rotating the field structure and holding the armature stationary. Assuming the brushes belonging to each phase short-circuited or closed through a resistance, and the armature field energized and held stationary, rotation of the armature will induce currents in its windings which will appear as direct currents in the resistances connected to those brushes which have a neutral position with respect to the field poles. The other brushes closed through their respective resistances will also carry a direct current, but of lesser intensity, depending upon the position they occupy on the commutator. If the field element be released and the armature field be allowed to rotate, it is apparent that this neutral position progresses at a corresponding angular velocity. Under such conditions, as the neutral position passes the brushes belonging to the various phases, an alternating polyphase current is flowing in the resistances connecting them. In the construction shown, the brushes are connected to the stator windings, and the polyphase currents collected are introduced into the stator winding. This winding is preferably arranged for as many poles as is the armature winding and connected for as many phases as have the currents collected from the commutator brushes. In the illustrated embodiment, the stator winding 4 is a three-phase winding, the coils $4^a$ (shown in full lines) belonging to one phase; the coils $4^b$ (shown in dot and dash lines) belonging to the second phase; and the coils $4^c$ (shown in dotted lines) belonging to the third phase.

The polyphase currents collected at the brushes circulate through the stator winding and create a revolving field having the same angular velocity as that of the field member. The brushes are connected to the stator winding so that the flux of the stator current produces a torque upon the stator field which adds itself to that resulting from the reaction between the armature field and the armature current. The field of the stator current is at right angles to the stator field of the field member at standstill of the field member, and this quadrature relation remains at all speeds of the field member and maintains a torque as long as the armature E. M. F. predominates over the stator counter E. M. F. The direction of rotation of the field member depends upon the relative direction of the magnetizing current of the two fields. If the torque of the stator field is in opposition to that of the armature field, the field member will be caused to rotate in the opposite direction to that in which it rotates when the two torques are in the same direction, since the torque produced by the stator winding predominates by reason of the large number of ampere turns therein as compared with those of the armature. The only energy required at start by the stator winding to produce this opposing torque, is that which is sufficient to overcome the resistance of the winding. Since the current in the armature to furnish this energy is comparatively small, the ampere turns are proportionately small, consequently, the armature torque is smaller, as above stated, and the torque produced by the stator winding predominates. Therefore, the reversal of the pole changer 29 serves to reverse the direction of rotation of the field member.

The armature being rotated by the prime mover through suitable connection with shaft 7, and the field member being secured to the shaft to be driven through suitable connection with the driven shaft 30 which is coupled to the sleeve 19, as shown in Fig. 1, the apparatus is started by cutting out all the stator field resistance, thereby producing a strong stator field, and inserting all the armature field resistance, thereby producing a weak armature field and generating a small potential in the armature which causes a considerable current to flow through the armature and stator windings due to the stationary stator field and the consequent absence of a counter-potential in the stator winding, the current in the stator windings coöperating with the full strength of the stator field, thereby producing a strong torque on the field member. As the armature field resistance is gradually cut out, the armature potential and current and torque produced thereby and by the increased stator current on the stator field are increased until the armature field attains its full strength and produces maximum torque. When the number of turns in series on the armature and stator is the same, the driven field member will be able to approximate half the speed of the driving armature, since at this speed, the fields being equal, the counter-potential of the stator will be equal to the potential of the armature. An increase of the driven speed above half is attained by leaving the armature field fully excited and weakening the stator field, and when the driven field member approaches the speed of the armature, the stator winding and the stator field may be entirely disconnected and either the slip rings 11 or the polyphase commutator brushes be short-circuited.

As above stated, this apparatus is suitable for use as a transmission for automobiles, and when so embodied, it may also be used as a starter for the internal combustion engine, operating as a direct current motor. For this purpose, a direct current is made to traverse the stator field and part of the stator winding, whereupon the stator becomes polarized and the field member immediately assumes its proper position and locks itself relative to the stator. A direct current is introduced into a pair of brushes having proper relation to the field which will rotate the armature and thus start the engine.

The circuits and switching mechanism for thus utilizing the apparatus, are illustrated diagrammatically in Fig. 3. Three contact blades 31$^a$, 31$^b$ and 31$^c$ of a double-throw switch are connected into the three leads 14′, 15′ and 16′, respectively, of the brushes 14, 15, 16, the contact blades 31$^a$ and 31$^c$ coöperating with battery contacts 31$^{a\prime}$ and 31$^{c\prime}$, and the contact blade 31$^b$ coöperating with the stationary contact 31$^{b\prime}$, in the lead 16′. In starting position, switch 31 is thrown to close the battery contacts, which movement opens the lead 16′ at contact 31$^{b\prime}$ and thus disconnects the brush 16 with the stator coils 4$^a$. This is the position of the switch shown in Fig. 3, and the armature and two phases of the stator windings are energized as follows: from battery 22 through lead 32, stationary contact 31$^{a\prime}$, movable contact 31$^a$ to the lead 15′, whence the current divides, one portion going to the brush 15, thence through the armature winding, brush 14, lead 14′, movable contact 31$^c$, stationary contact 31$^{c\prime}$, leads 33, 24 and 26 back to the battery; and the other portion going through the other part of lead 15′, coils 4$^c$, thence through coils 4$^b$, and lead 14′ back to the battery as before. The movement of the rheostat contact lever 34 one step to the right from the open position shown, closes the battery contact with the two fields. The armature field coils 21$^{a\prime}$, 21$^{b\prime}$ and 21$^{c\prime}$, which are connected to the slip ring 21$^d$ and 21$^e$ are energized as follows: from the right side of the battery 22 through the lead 25, rheostat 27, lead 25′, brush 21$^f$, slip ring 21$^d$, armature field coils, slip ring 21$^e$, brush 21$^g$ and lead 26 back to the battery. The stator field coils 20$^{a\prime}$, 20$^{b\prime}$ and 20$^{c\prime}$, which are connected to the slip rings 20$^d$ and 20$^e$, are energized as follows: from battery 22 through leads 25 and 23, rheostat 28, lead 23′, contact of pole changer 29, lead 24′ to brush 20$^g$, thence through the slip rings and coils to brush 20$^f$, thence through lead 23″, contact of pole changer 29, and lead 24, back to the battery.

After the engine is started, the switch 31 is thrown to its other position, which closes the connection between the movable contact 31$^b$ and the stationary contact 31$^{b\prime}$, and at the same time disconnects the battery supply from the leads 14′ and 15′. The three brushes 14, 15 and 16 are now connected to the three phases of the stator winding and the device is ready for use for power transmission.

As previously stated, in starting the device to transmit power from the driving shaft 7 to the driven shaft 30, the stator field resistance is cut out while the armature field resistance is in. This is the condition when the rheostat contact lever 34 occupies the position one step to the right of that shown in Fig. 3. The rotation of the armature generates a small potential, but the current in the stator windings caused to flow by this potential is considerable, due to the absence of any counter-potential, and the current in the stator windings coöperates with the full strength of the stator field and creates a strong torque on the field member. The armature resistance is now gradually cut out by moving the contact lever 34 step by step to the right until at the intermediate position of the contact lever 34 the armature field has its full strength and produces maximum torque. At this point, if the number of turns in series on the armature and stator is the same, the counter-potential of the stator winding will equal the armature potential and the driven field member will have a speed approximately one half that of the driving armature. To increase this relative speed of the driven field member, contact lever 34 is moved step by step to the right, which leaves the armature field fully excited and inserts more and more resistance into the stator field. There are as many steps or speed adjustments as there are contact points in the rheostat, and when the driven field member has attained a speed so near to that of the armature as to allow only for the slip necessary to induce the required potential, the stator winding and stator field are entirely disconnected by moving the contact lever 34 against the last stop to the right, which is electrically disconnected. It will be observed that the iron losses in the stator are thereby substantially eliminated and the only iron loss in the apparatus is due to the low armature frequency caused by the slip of the field. It will also be observed that this construction offers the advantage of manipulating the comparatively small field currents instead of the polyphase power current, as is the case in the construction described in my aforesaid prior application. Furthermore, this invention provides for a simple and strong revolving field structure, as compared with my said former construction. In that device the adjoining poles of opposite polarity and also the two pole faces of each pole are bridged or connected by the supporting spider, hence it is necessary in that construction to use a spider of non-magnetic material, such as aluminum or brass. Such a field structure is necessarily weak and consists of many parts, and hence cannot be run at very high speeds. In the present construction, however, due to the peculiar arrangement of poles and connecting yokes, the entire field structure may be cast in one piece and the supporting spider 18 may also be of steel, since only such pole faces are joined thereby as are of the same polarity. The structure is thereby rendered much stronger as well as more economical and simpler of manufacture.

It is obvious that various modifications may be made in the construction shown in the drawings and above particularly described, within the principle and scope of my invention.

I claim:

1. A dynamo-electric machine comprising an armature and a winding therefor, a stator, a winding for the stator, two magnetic fields, one arranged in inductive relation to the armature winding and the other arranged in inductive relation to the stator winding, and means for independently energizing the two fields.

2. A dynamo-electric machine comprising an armature and a winding therefor, a stator, a winding for the stator, means for connecting the armature winding with the stator winding, two magnetic fields, one arranged in inductive relation to the armature winding and the other arranged in inductive relation to the stator winding, and means for independently energizing the two fields.

3. A dynamo-electric machine comprising an armature and a winding therefor, a stator, a winding for the stator, a rotative field member having an armature field component arranged in inductive relation to the armature winding and a stator field component arranged in inductive relation to the stator winding, and means for varying the relative field strength of the two components.

4. A dynamo-electric machine comprising an armature and a winding therefor, a stator, a winding for the stator, means for connecting the armature winding with the stator winding, a rotative field member having an armature field component arranged in inductive relation to the armature winding and a stator field component arranged in inductive relation to the stator winding, and means for varying the relative field strength of the two components.

5. A dynamo-electric machine comprising an armature and a winding therefor, a stator, a winding for the stator, a rotative field member having an armature field component arranged in inductive relation to the armature winding and a stator field component arranged in inductive relation to the stator winding, means for varying the relative field strength of the two components, and means for reversing the polarity of one field component relative to that of the other field component.

6. A dynamo-electric machine comprising an armature and a winding therefor, a stator, a winding for the stator, means for connecting the armature winding with the stator winding, a rotative field member having an armature field component arranged in inductive relation to the armature winding and a stator field component arranged in inductive relation to the stator winding, means for varying the relative field strength of the two components, and means for reversing the polarity of one field component relative to that of the other field component.

7. In a dynamo-electric machine, a field member having a plurality of pole faces on one side and a plurality of pole faces on another side thereof, a magnetizing coil for each of the pole faces, and a plurality of magnetic yokes connecting the pole faces on one side with the adjacent pole faces on the other side, said yokes serving to conduct the difference between the fluxes on one side and the fluxes on the other side when the two are unequal but unidirectional and serving to carry the sum of the fluxes when the two are opposed.

8. In a dynamo-electric machine, a field member having a plurality of internal and a plurality of external pole faces arranged in alternate relation, and a plurality of magnetic yokes connecting the alternate external pole faces with the intermediate internal pole faces and serving to conduct the difference between the external and internal fluxes when the two are unequal but unidirectional and serving to carry the sum of the external and internal fluxes when they are opposed.

9. In a dynamo-electric machine, a field member having a plurality of pole faces on one side and a plurality of pole faces on another side thereof, a magnetizing coil for each of the pole faces, means for controlling the strength and polarity of the magnetizing current for the coils on one side relative to that for the coils on the other side, and a plurality of magnetic yokes connecting the pole faces on one side with the adjacent pole faces on the other side, said yokes serving to conduct the difference between the fluxes on one side and the fluxes on the other side when the two are unequal but unidirectional and serving to carry the sum of the fluxes when the two are opposed.

10. In a dynamo-electric machine, a field member having a plurality of internal and a plurality of external pole faces, means for producing a flux at the pole faces and for varying the strength and changing the polarity of the flux at the internal pole faces relative to the flux at the outer pole faces, and a plurality of magnetic yokes connecting the alternate external pole faces with the intermediate internal pole faces and serving to conduct the difference between the external and internal fluxes when the two are unequal but unidirectional and serving to carry the sum of the external and internal fluxes when they are opposed.

11. In a dynamo-electric machine, in combination, a stator and a winding therefor, a concentric rotatable armature and a winding therefor; a rotative field member comprising a carrying ring disposed between the stator and armature, armature field magnets carried by the ring in inductive relation to the armature, and stator field magnets carried by the ring in inductive relation to the stator; and means for changing the relative strength and polarity of the two fields.

12. In a dynamo-electric machine, in combination, a stator and a winding therefor, a concentric rotatable armature, a winding therefor, a rotatable field member comprising a magnetic ring disposed between the stator and armature and two sets of field coils carried thereby on opposite sides thereof, the coils of the two sets being arranged alternately about the ring, thereby forming a stator field and an armature field, and means for changing the relative strength and polarity of the two fields.

13. In a dynamo-electric machine, in combination, a stator and a winding therefor, a concentric rotatable armature and a winding therefor, means for connecting the armature winding with the stator winding, a rotative field member comprising a carrying ring disposed between the stator and armature, armature field magnets carried by the ring in inductive relation to the armature, and stator field magnets carried by the ring in inductive relation to the stator; and means for changing the relative strength and polarity of the two fields.

14. In a dynamo-electric machine, in combination, a stator and a winding therefor, a concentric rotatable armature, a winding therefor, means for connecting the armature winding with the stator winding; a rotatable field member comprising a magnetic ring disposed between the stator and armature and two sets of field coils carried thereby on opposite sides thereof, the coils of the two sets being arranged alternately about the ring, thereby forming a stator field and an armature field; and means for changing the relative strength and polarity of the stator and armature fields.

15. In a dynamo-electric machine, in combination, a stator and a winding therefor, a concentric rotatable armature and a winding therefor; a rotatable field member disposed between the stator and armature comprising a magnetic ring having alternately arranged internal and external polar projections, and independent field windings upon the two sets of projections, thereby forming a stator field in inductive relation to the stator winding and an armature field in inductive relation to the armature winding; and means for independently energizing and relatively reversing the two fields.

16. In a dynamo-electric machine, in combination, a stator and a winding therefor, a concentric rotatable armature and a winding therefor, means for connecting the armature winding with the stator winding; a rotatable field member disposed between the stator and armature comprising a magnetic ring having alternately arranged internal and external polar projections, and independent field windings upon the two sets of projections, thereby forming a stator field in inductive relation to the stator winding and an armature field in inductive relation to the armature winding; and means for independently energizing the two fields.

17. In a dynamo-electric machine, in combination, a stator and a winding therefor, a concentric rotatable armature and a winding therefor; a rotative field member comprising a carrying ring disposed between the stator and armature, armature field magnets carried by the ring in inductive relation to the armature, and stator field magnets carried by the ring in inductive relation to the stator; means for supplying magnetizing current independently to the two fields, and means for reversing the current in one field relative to that in the other field.

18. In a dynamo-electric machine, in combination, a stator and a winding therefor, a concentric rotatable armature and a winding therefor; a rotatable field member disposed between the stator and armature comprising a magnetic ring having alternately arranged internal and external polar projections, and independent field windings upon the two sets of projections, thereby forming a stator field in inductive relation to the stator winding and an armature field in inductive relation to the armature winding; means for independently energizing the two fields, and means for reversing the current in one field relative to that in the other field.

19. In a dynamo-electric machine, in combination, a stator and a winding therefor, a concentric rotatable armature and a winding therefor, means for connecting the armature winding with the stator winding; a rotatable field member disposed between the stator and armature comprising a magnetic ring having alternately arranged internal and external polar projections, and independent field windings upon the two sets of projections, thereby forming a stator field in inductive relation to the stator winding and an armature field in inductive relation to the armature winding; means for independently energizing the two fields, and means for reversing the current in one field relative to that in the other field.

20. In a dynamo-electric machine, in combination, a rotatable current generating element, a stationary element including a winding arranged to consume the current generated in the generating element, a rotatable field member disposed between the two elements and having two sets of field magnets, one set being disposed in inductive relation to each element, and means for changing the relative strength and polarity of the two sets of field magnets.

21. In a dynamo-electric machine, in combination, a rotatable current generating element, a stationary element including a winding arranged to consume the current generated in the generating element; a rotatable field member disposed between the two elements comprising a magnetic ring having alternately arranged internal and external polar projections, and independent field windings upon the two sets of projections, thereby forming two fields in inductive relation to the respective elements; and means for independently energizing the two fields.

22. In a dynamo-electric machine, in combination, a rotatable current generating element, a stationary element including a winding arranged to consume the current generated in the generating element, means for transferring current between said elements including a commutator and stationary brushes, a rotatable field member disposed between the two elements and having two sets of field magnets, one set being disposed in inductive relation to each element, a source of magnetizing current for the two fields, and means for controlling the relative strength of the two fields.

23. In a dynamo-electric machine, in combination, a rotatable current generating element, a stationary element including a winding arranged to consume the current generated in the generating element, means for transferring current between said elements including a commutator and stationary brushes; a rotatable field member disposed between the two elements comprising a magnetic ring having alternately arranged internal and external polar projections, and independent field windings upon the two sets of projections, thereby forming two fields in inductive relation to the respective elements; and means for controlling the relative strength and polarity of the two fields.

24. In a dynamo-electric machine, a stator and polyphase winding therefor, a rotary armature and a winding therefor, a rotatable field member disposed between the stator and armature and having two sets of field magnets, one set being arranged in inductive relation to the stator winding and the other set being arranged in inductive relation to the armature winding, means for independently energizing the two fields, and means for supplying current to the armature winding and to the stator winding.

25. In a dynamo-electric machine, a stator and a polyphase winding therefor, a rotary armature and a winding therefor; a rotatable field member disposed between the stator and armature comprising a magnetic ring having alternately arranged internal and external polar projections, and independent field windings upon the two sets of projections, thereby forming two fields in inductive relation to the stator and armature windings, respectively; means for independently energizing the two fields, and means for supplying current to the armature winding and to the stator winding.

26. In a dynamo-electric machine, an armature and a winding therefor, a stator and a polyphase winding therefor, a commutator for the armature, stationary polyphase brushes engaging the commutator and connected to the polyphase stator winding, a rotatable member disposed between the armature and stator, and two independently controlled fields arranged in inductive relation to the stator and armature windings, respectively, and carried by the rotatable member.

27. In a dynamo-electric machine, an armature and a winding therefor, a stator and a polyphase winding therefor, a commutator for the armature, stationary polyphase brushes engaging the commutator and connected to the polyphase stator winding, a rotatable member disposed between the armature and stator, and two independently energizable sets of field magnets carried by the rotatable member, one set being arranged in inductive relation to the armature winding and the other set in inductive relation to the stator winding.

In witness whereof, I subscribe my signature, in the presence of two witnesses.

ALFONS H. NEULAND.

Witnesses:
VICTOR D. BORST,
WALDO M. CHAPIN.